(12) United States Patent
Kuo

(10) Patent No.: US 6,343,404 B1
(45) Date of Patent: Feb. 5, 2002

(54) MULTI-STEP POSITIONING DEVICE OF TRUNK PULL ROD

(75) Inventor: Chung-Hsien Kuo, Taipei Hsien (TW)

(73) Assignee: Chaw Khong Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 09/598,018

(22) Filed: Jun. 21, 2000

(51) Int. Cl.$^7$ ................ B25G 1/04; A45C 3/00
(52) U.S. Cl. ............ 16/113.1; 280/655; 190/39; 190/115
(58) Field of Search ............... 16/113.1, 429, 16/405; 280/655, 655.1, 47.371, 47.315; 190/39, 115; 403/92–94, 109.2, 109.3

(56) References Cited

U.S. PATENT DOCUMENTS

| | | | | |
|---|---|---|---|---|
| 5,620,070 A | * | 4/1997 | Wang | 16/113.1 |
| 5,628,088 A | * | 5/1997 | Chen | 16/113.1 |
| 5,669,103 A | * | 9/1997 | Hui | 16/113.1 |
| 5,729,866 A | * | 3/1998 | Chg | 16/113.1 |
| 5,781,965 A | * | 7/1998 | Lu | 16/113.1 |
| 5,911,263 A | * | 6/1999 | Wu | 16/113.1 |
| 6,026,543 A | * | 2/2000 | Chen | 16/113.1 |
| 6,131,928 A | * | 10/2000 | Tung | 16/131.1 |

* cited by examiner

Primary Examiner—Chuck Y. Mah
(74) Attorney, Agent, or Firm—Rosenberg, Klein & Lee

(57) ABSTRACT

A multi-step positioning device of a trunk pull rod has a pair of pull rods at two sides thereof. Each pull rod has an inner upper rod and an outer lower rod therein. The rod body has two sides of round arc shapes. After engaging, the round arc portions of the two rods are formed with gaps. Porous pieces are placed in the gaps. The porous piece passes through the outer lower rod. The upper end of the outer lower rod is connected to an upper rod sleeve. Protruding buckles at two sides of the upper rod sleeve buckles with the buckling holes with respect to the outer lower rod. The lower end of the inner upper rod is connected to a lower rod sleeve. The slender end of the lower rod sleeve passes through the inner upper rod. Part of the enlarged end portion thereof having an outer diameter identical to that of the inner upper rod passes through the outer lower rod. The top end surface of the lower rod sleeve serves to be inserted by the sliding piece. A driving piece is connected at the upper end of the sliding piece. The driving piece passes through the inner upper rod to be connected to the control piece of the handle. The enlarged end of the lower rod sleeve is formed with at least one through hole facing to the porous piece. Each through hole is passed by a buckling ball. Each sliding piece is installed with semicircular grooves facing to the through hole.

7 Claims, 10 Drawing Sheets

MULTI-STEP POSITIONING DEVICE OF TRUNK PULL ROD

FIELD OF THE INVENTION

The present invention relates to a multi-step positioning device of a trunk pull rod, which is especially suitable to a pull rod fixing means being adjusted steplessly.

BACKGROUND OF THE INVENTION

Traveling for business or other purposes is prevailed currently, and thus trunks becomes a required tool in traveling. Telescopic pull rods are important components in the design of a trunk, which can provide great convenience to the travelers. Since the height of everyone is different, while it is preferred that the trunk is pulled by an angle of 45 degrees. In order to meet various demands, two sectional or multiple sectional pull rods are preferred and are widely used. Rods with two sections and one operation step is generally used in the design of trunks. Namely, after the upper section of the pull rod is pulled out, only the lower end of the upper sectional rod and the upper end of the lower sectional rod is positioned. The use of each sections of the rods is not well designed. There are some difference according to the height of the trunk. Therefore, a three sectional rod or a four sectional rod is designed. However, the operation of these multi-sectional rod is not preferred since it can not be fine adjusted. Therefore, a multi-sectional or stepless structure is designed. Furthermore, the positioning of the two sectional rod is not confined in a single position. Many positions serves to position the rod. Even every position is usable. The positions for positioning is conventionally installed with continuous holes. However, this will deteriorate the outlook, and weak the structure. In another design, the positioning structure is installed in the rod. FIG. 10 shows a prior art structure. A positioning piece 1 is installed in the outer rod 2. The positioning piece 1 is installed with a bank of positioning holes 11 for achieving the object of multiple step adjustment for satisfying the requirement of the user. As shown in the figure, the positioning piece is necessary to be installed in the rod, therefore, a buckling structure is installed in the outer rod 2, in which a pair of inward protruding strips 21 are used. Although the shape of the outer rod 2 has a long elliptic shape, the inner rod has a square shape, and therefore, the visual feeling is effected. Another, the outer rod is a rectangular rod, while the inner rod is a square rod, but this is not good in visual feeling, since square rod looks very bulky. Thus, it is not met the requirement of compactness and it has many defects. Besides, a pull rod adjusting means of gears and racks is designed, wherein the gear must be adjusted precisely for positioning. It is inconvenient to the user. Furthermore, the whole structure is heavy and is almost not used commercially. An adjusting rod of teeth block and rack is designed, further. Although it has the advantages of steplessness, the application is limited. Too many adjustments cause the user not to select it properly. However, from the experiences of the applicant, there are a great extent in the design of the pull rod to satisfy the requirement of consumers.

SUMMARY OF THE INVENTION

Accordingly, the primary object of the present invention is to provide a multi-step positioning device of a trunk pull rod for using the space of the pull rod more efficiency so that the original two rod types are converted to a multiple rod type. Furthermore, elliptic rods are used instead of the conventional square rods. By the space between inner and outer rods to clamp the porous piece, the shape of the porous piece is formed as cambered rod for using space sufficient. Besides, the ball shape buckling device is used to be buckled with the porous piece. Therefore, most of the requirement in use is satisfied. Moreover, the porous piece of the present invention is matched with a handle to be adjusted in positions. The use of the sliding piece in the fixing block can be used with a pressing down sliding piece or a pull up sliding piece so that the whole structure is more convenient.

Another object of the present invention is to provide a multi-step positioning device of a trunk pull rod, which can be used in the adjustment of a third sectional rod. Each section is used in an optimum condition. Each rod is retained in a specific shape for saving space.

In the present invention, a multi-step positioning device of a trunk pull rod having a pair of pull rods at two sides thereof is disclosed. A handle is connected between the two pull rods Each pull rod including an inner upper rod and an outer lower rod. A gap is formed between the inner upper rod and the outer lower rod. A porous piece is placed in the gap in at least one side thereof. The porous piece is fixed in the outer lower rod and. An upper end of the outer lower rod is connected to an upper rod sleeve. Two sides of the upper rod sleeve each have a protruded buckle for being buckled to a buckling hole with respect to the outer lower rod. A lower end of the inner upper rod is connected to a lower rod sleeve. The slender end portion of the lower rod sleeve passing through the inner upper rod, and part of the enlarged end portion thereof has an outer diameter identical to that of the inner upper rod part of that portion having an inner diameter identical to that of the outer lower rod and passes through the outer lower rod. An inner top surface of the inner upper rod is inserted with a sliding piece. The upper end of the sliding piece is connected to a driving piece. The driving piece passes through the inner upper rod to be connected to a control piece on the handle; while the enlarged end of the lower rod sleeve facing to the porous piece is formed with at least one through hole. Each through hole is placed with one buckling ball. A respective semicircular grooves is installed on the porous piece at places facing to the through hole, which is buckled by the edge of the sliding piece so as to the inner upper rod and the outer lower rod are positioned. If the buckling ball slides back to the places of the through hole of the lower rod sleeve and the semicircular grooves of the sliding piece, then the positioned is released, each rod can move freely.

The various objects and advantages of the present invention will be more readily understood from the following detailed description when reading in conjunction with the appended drawing.

DETAILED DESCRIPTION OF THE PREFERRED

Figure 1:
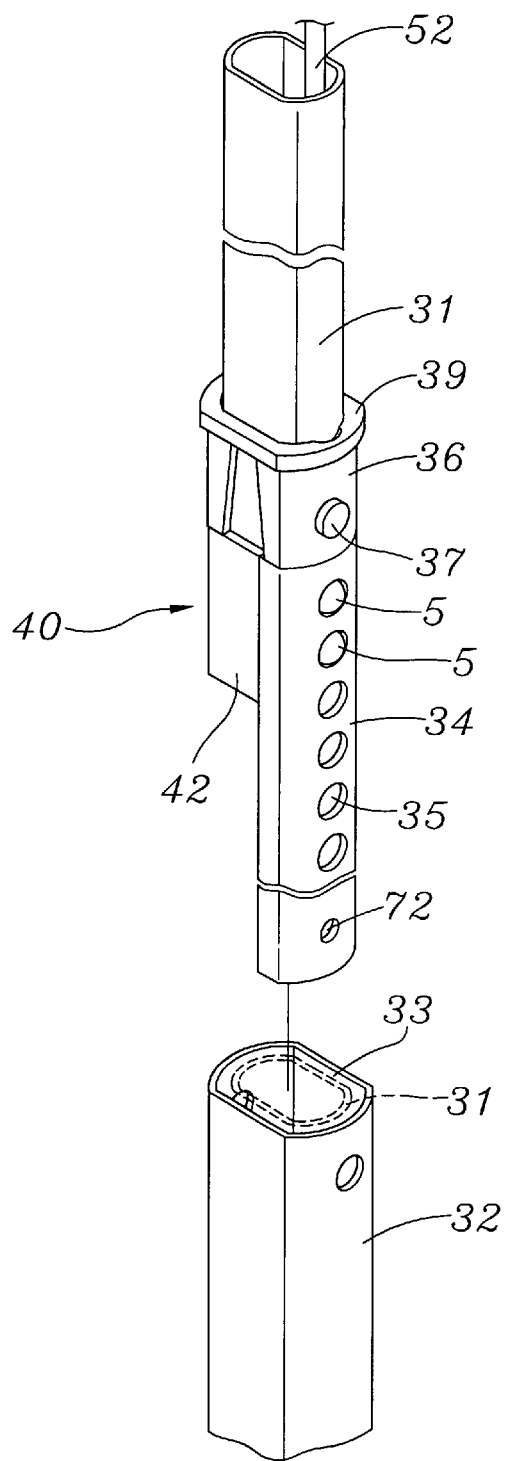
FIG. 1 is a perspective view of the present invention.
Figure 2:
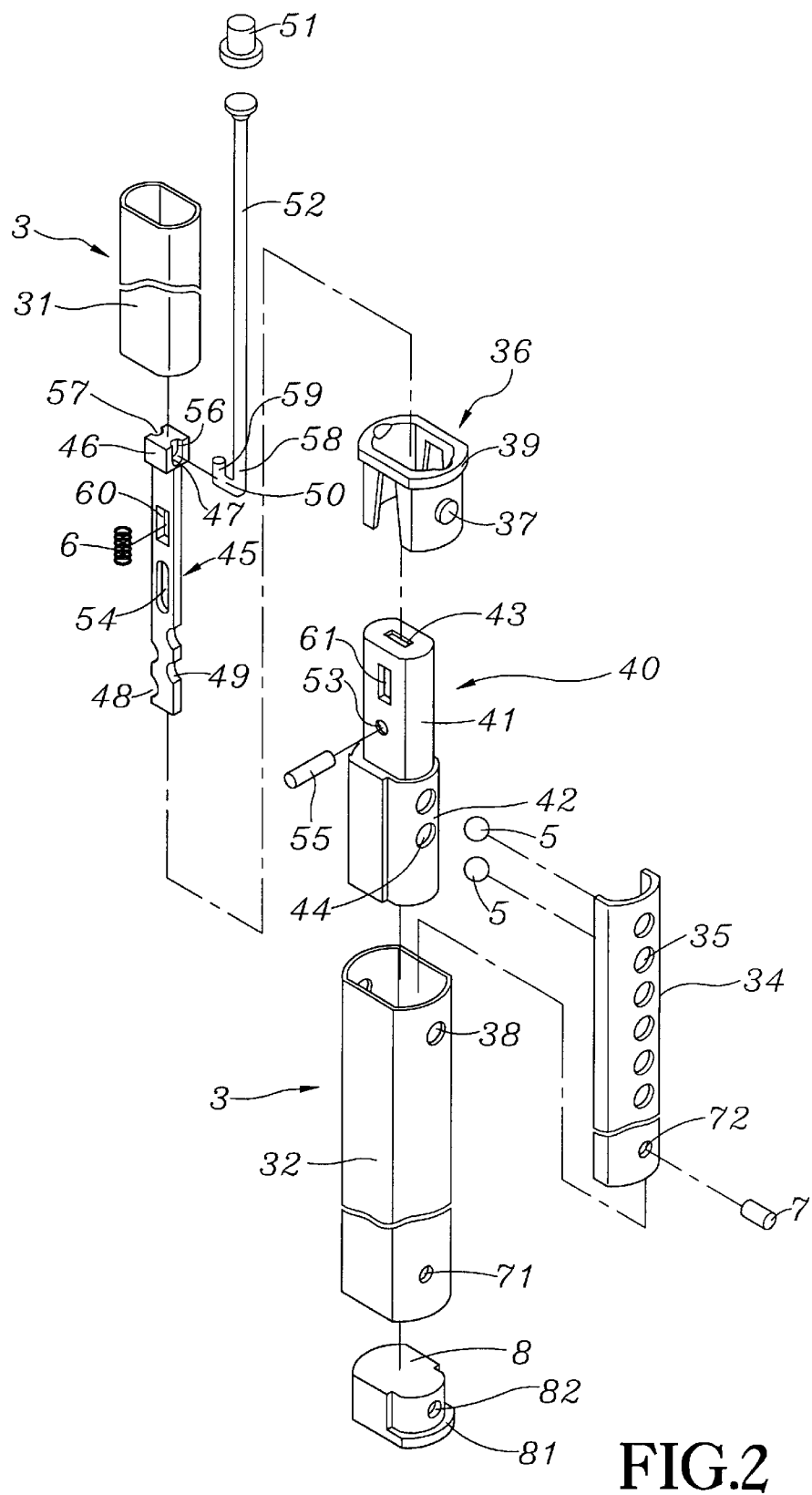
FIG. 2 is an exploded perspective view of the present invention.
Figure 3:
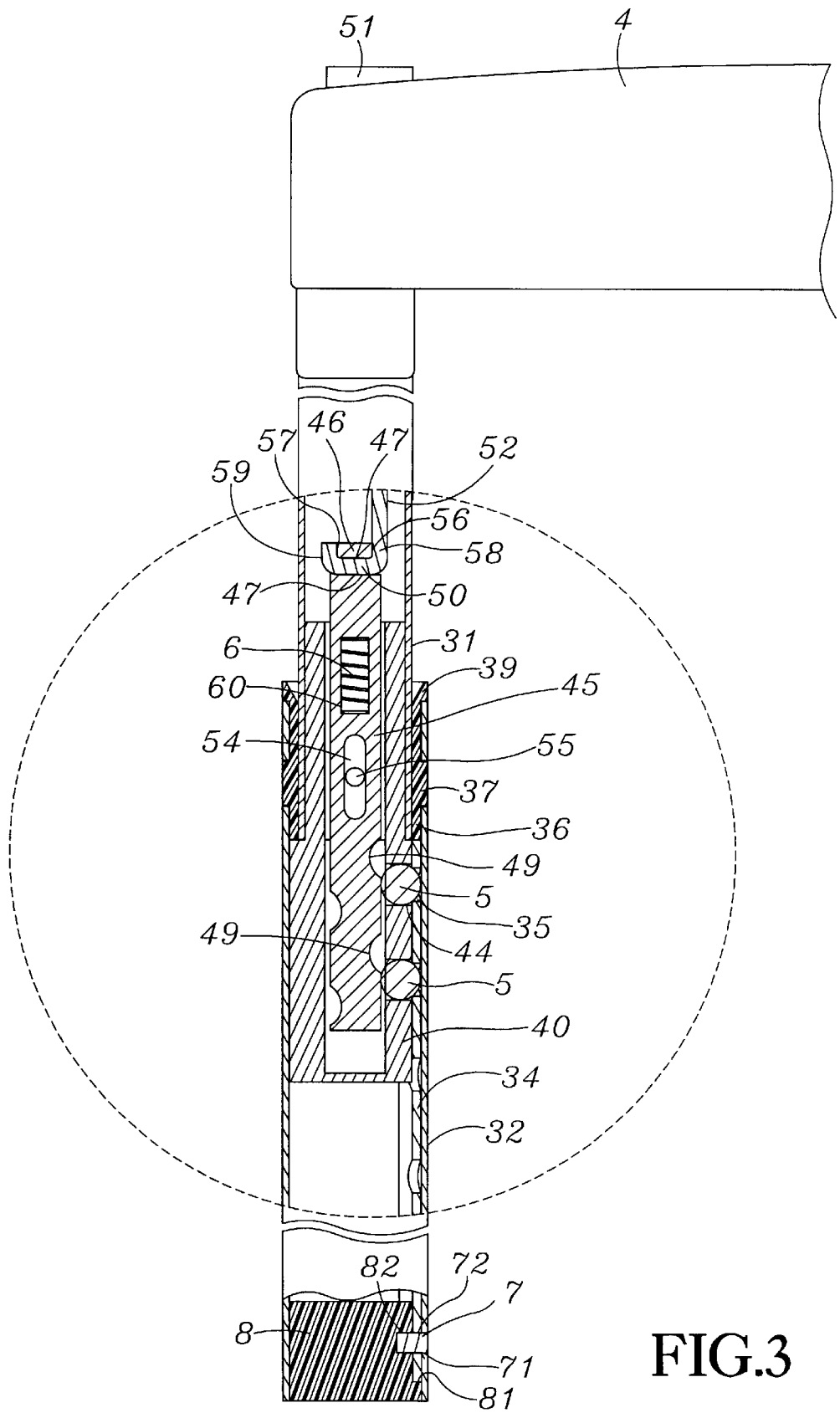
FIG. 3 is a partial cross sectional view showing that the present invention is not moved.
Figure 4:
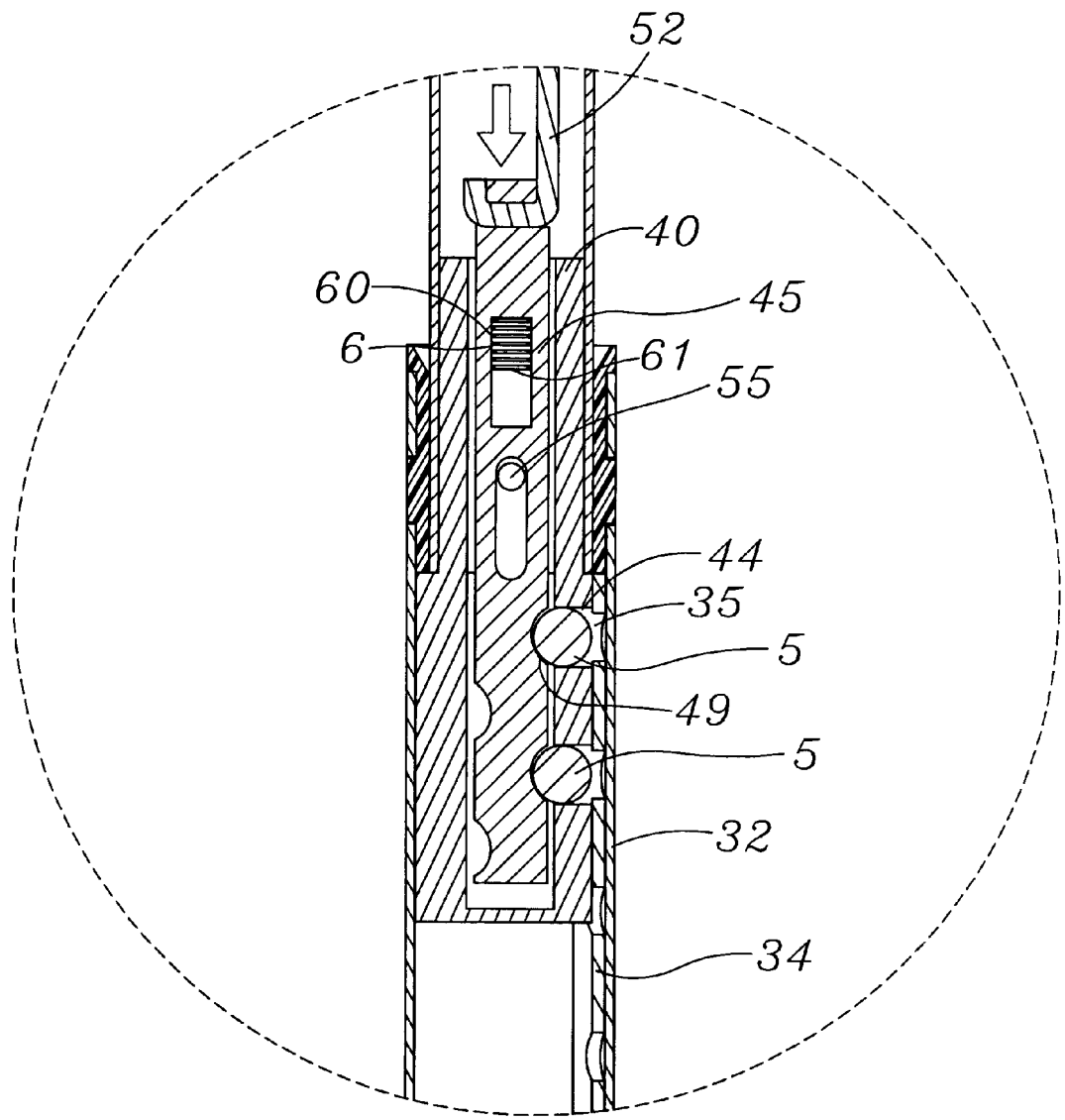
FIG. 4 is a partial cross sectional view of FIG.3, wherein the sliding piece is pressed.
Figure 5:
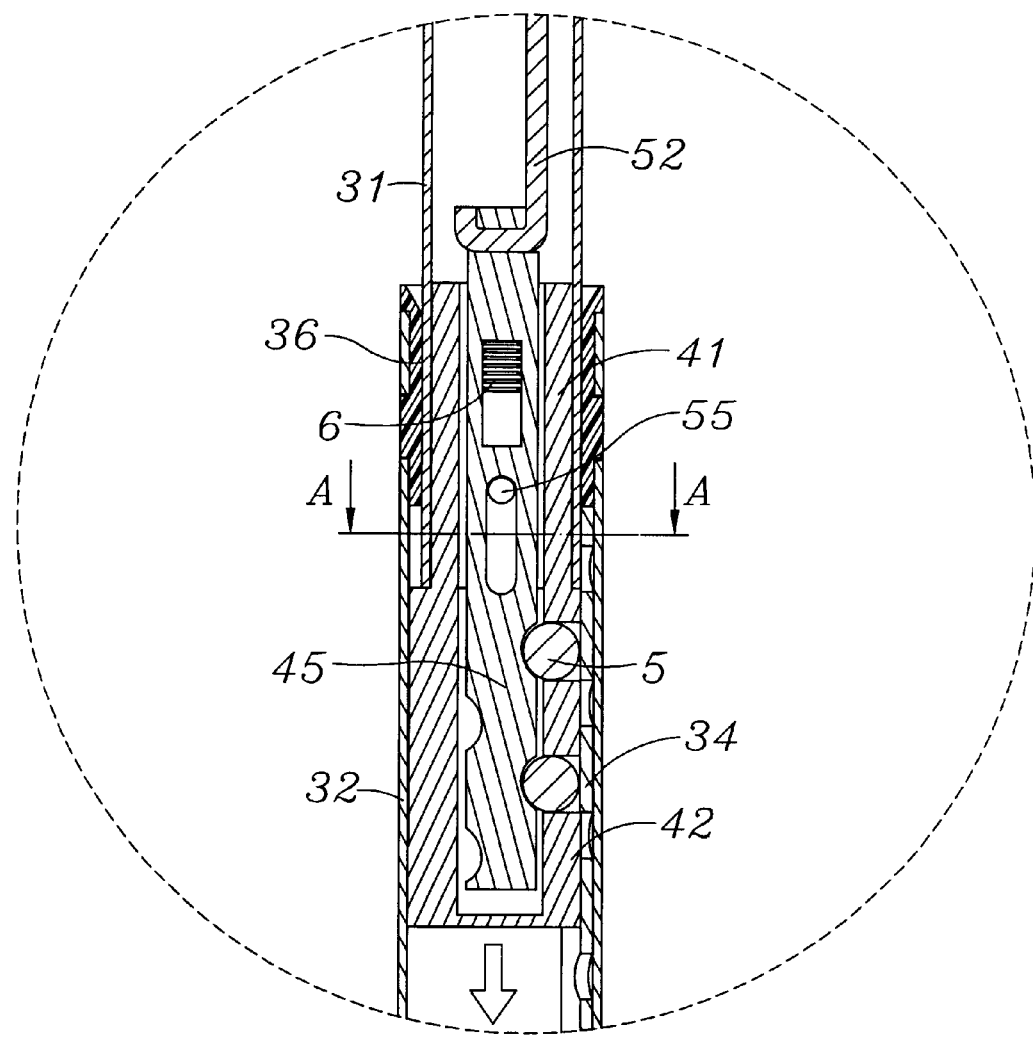
FIG. 5 is a partial cross sectional view showing the pull rod in FIG. 3 being moved.
Figure 6:
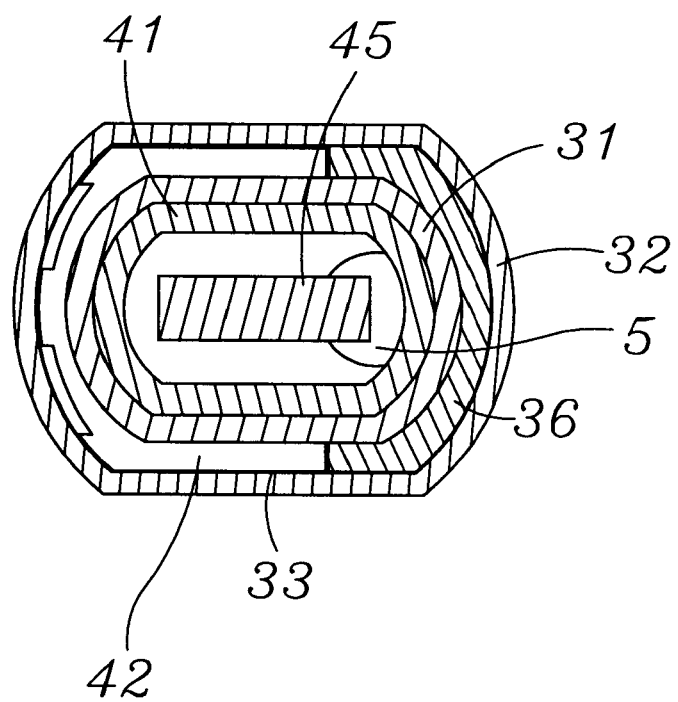
FIG. 6 is a cross sectional view along line A—A of FIG. 5.

With reference to FIGS. 1 to 9, a multi-step positioning device of a trunk pull rod of the present invention is illustrated therein. The multi-step positioning device of a trunk pull rod has a pair of pull rods 3 at two sides thereof. A handle 4 is connected between the two pull rods 3. Each pull rod 3 includes an inner upper rod 31 and an outer lower rod 32. The rod body of the pull rod 3 has two sides with a long elliptic shape. The round arc portions of the two rods 31 and 32 are engaged with one another, and thus a gap is formed therebetween. A porous piece 34 is placed in the gap 33 at one side or two sides. The porous piece 34 is fixed in the outer lower rod 32 and has a long strip shape as a cambered strip. A plurality of holes 35 in a spaced arrangement is installed on the porous piece 34. The upper end of the porous piece 34 resists against the lower end of the upper rod sleeve 36, while the lower end of the porous piece 34 is installed with a lower inner fixing hole 71. A short pin 7 is inserted between the lower outer fixing hole 71 and a lower inner fixing hole 72 so that the lower rod sleeve 40 resists against the periphery of the porous piece and thus the object of fixing the porous piece is achieved. A plug 8 is inserted in the outer lower rod 32. The lower end of the plug 8 near the porous piece 34 is installed with a round groove 81 for being inserted in the porous piece 34 and the short pin 7 is inserted in the transversal hole 82 of the plug 8. Therefore, the porous piece 34 is fixed. The cross section of the porous piece 34 can be a round arc shape, or a channel shape or a shape having a round body with two parallel sides.

The upper end of the outer lower rod 32 is connected to the upper rod sleeve 36. Each of the two sides of the upper rod sleeve 36 has a respective protruded buckle 37 for buckling the outer lower rod 32 with respect to a buckling hole 38. The top 39 of the upper rod sleeve 39 is buckled in the top end of the outer lower rod 32.

The lower end of the inner upper rod 31 is connected to the lower rod sleeve 40. The slender end portion of the lower rod sleeve 40 passes through the inner upper rod 31, and part of the enlarged end portion 42 thereof has an outer diameter identical to that of the inner upper rod 31, part of that portion has an inner diameter identical to that of the outer lower rod 32 and passes through the outer lower rod 32.

The inner top surface of the inner upper rod 40 may be installed with a groove 43 for being inserted with a sliding piece 45. The upper end of the sliding piece 45 has a combining block 46. A fixing hole 47 formed on the block is inserted by one end of the driving piece 52. The lower end of the driving piece 52 is formed as a hook which is divided as a lower section 48, a transversal section 50, and a hook section 59 which are formed as a U shape for being buckled in a right straight groove 56 and a left straight groove 57 at two sides of the combining block 46. Namely, the lower section 58 is fixed to the right straight groove 56, the transversal section 50 passes through the fixing hole 47 and the hook section 59 is fixed in the left straight groove 57. The driving piece 52 passes through the inner upper rod 31 to be connected to one control piece 51 of the handle 4.

The enlarged end portion 42 of the lower rod sleeve 40 facing the porous piece 34 is installed with at least one through hole 44. Each through hole 44 is passed through by the buckling ball 5. Respectively semicircular grooves 49 is installed in the sliding piece 45 toward each through hole 44 so that the buckling ball 5 slides to the places of the through holes 44 of the lower rod sleeve 40 and the holes 35 of the porous piece 34 so as to be buckled by the edge of the sliding piece 45 so that the two rods 31 and 32 are positioned without movement. If the buckling ball 5 slides to the through hole 44 of the lower rod sleeve 40 and the semicircular groove 49 of the sliding piece 45 to release the buckling of the two rods 31 and 32, then each rod may move freely.

A pin hole 53 is installed in the lower rod sleeve 40 and an elliptic hole 54 is installed in the sliding piece 45. A pin 55 passes through the pin hole 53 and the elliptic hole 54 of the sliding piece 45 so that the sliding piece 45 will not separate from the lower rod sleeve 40 and is movable in the range of the elliptic hole 54. Since the sliding piece 45 of the present invention may provide the use for pushing upwards and pulling downwards, thus two sides of the sliding piece 45 are installed with semicircular grooves 49. In the use of pressing and pushing shown in FIGS. 3 to 5, an compressible spring 6 is connected to a square groove 60 in the sliding piece 45, and the width of the compressible spring 61 is larger than that of the square groove 60 so as to be buckled in one confining groove 61 on the lower rod sleeve 40, and thus the compressible spring is only movable in the space of the confining groove 61.

Figure 7:
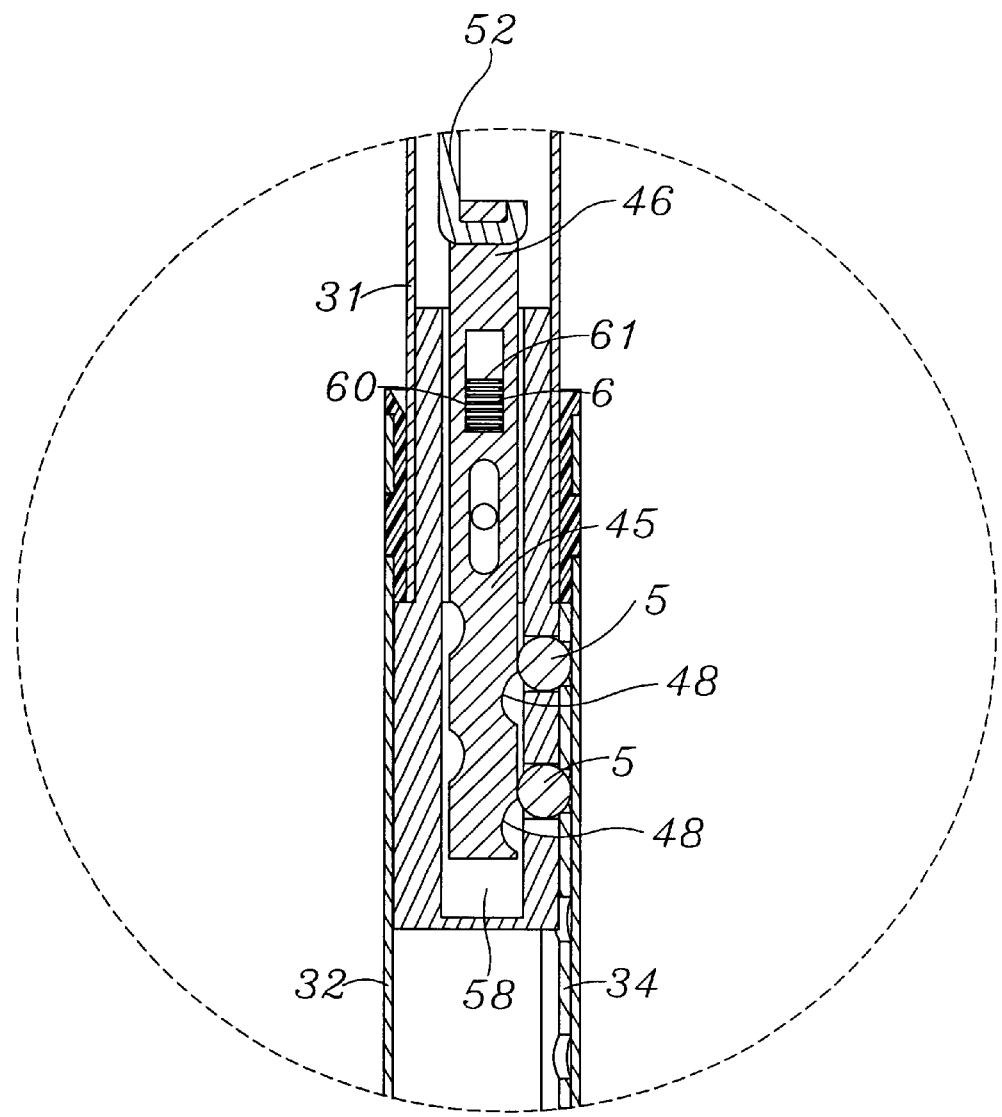
FIG. 7 is a cross sectional view showing another embodiment of the present invention which is not been moved.
Figure 8:
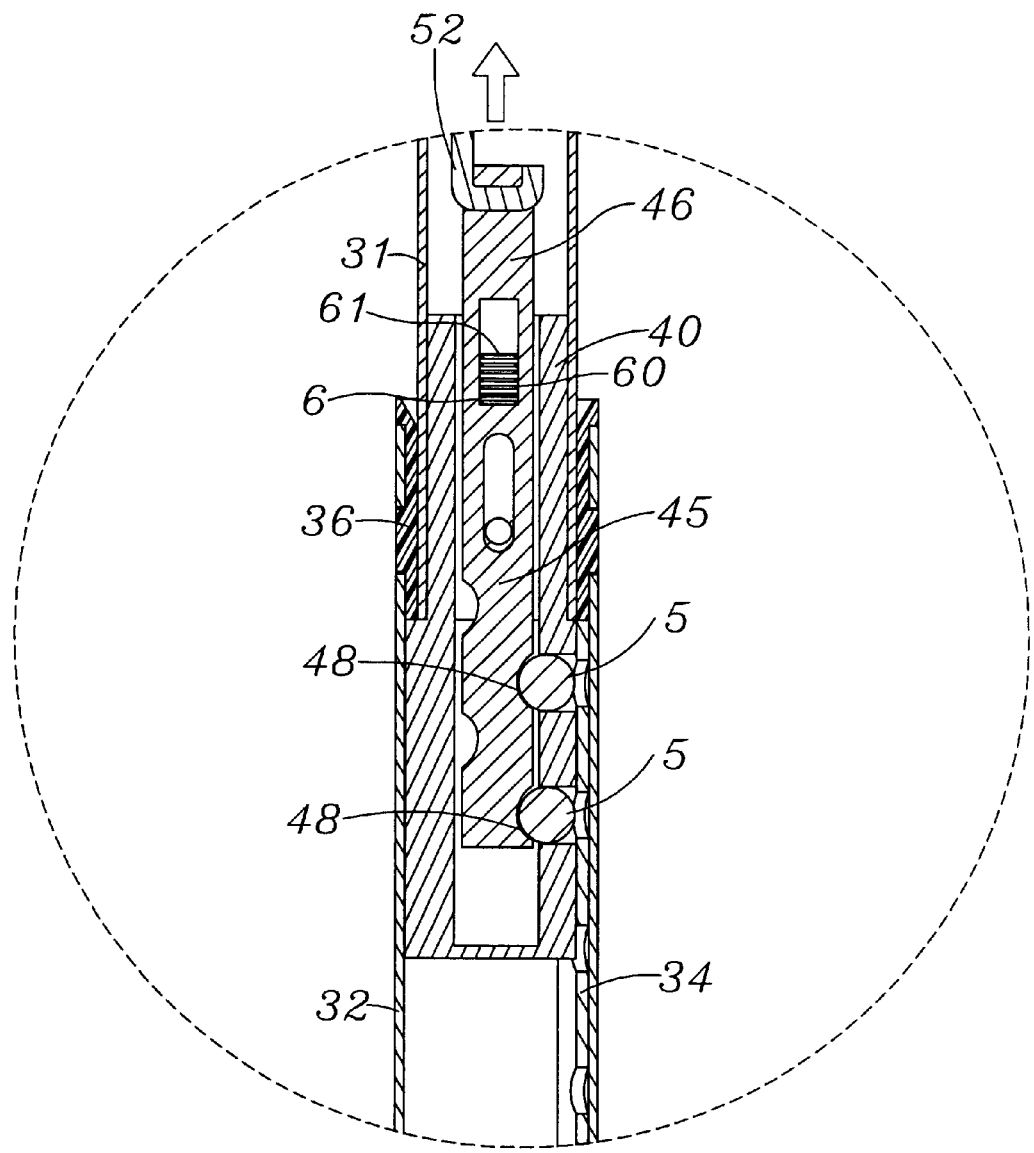
FIG. 8 is a partial cross sectional view showing the sliding piece being pulled upwards in another embodiment of the present invention.
Figure 9:
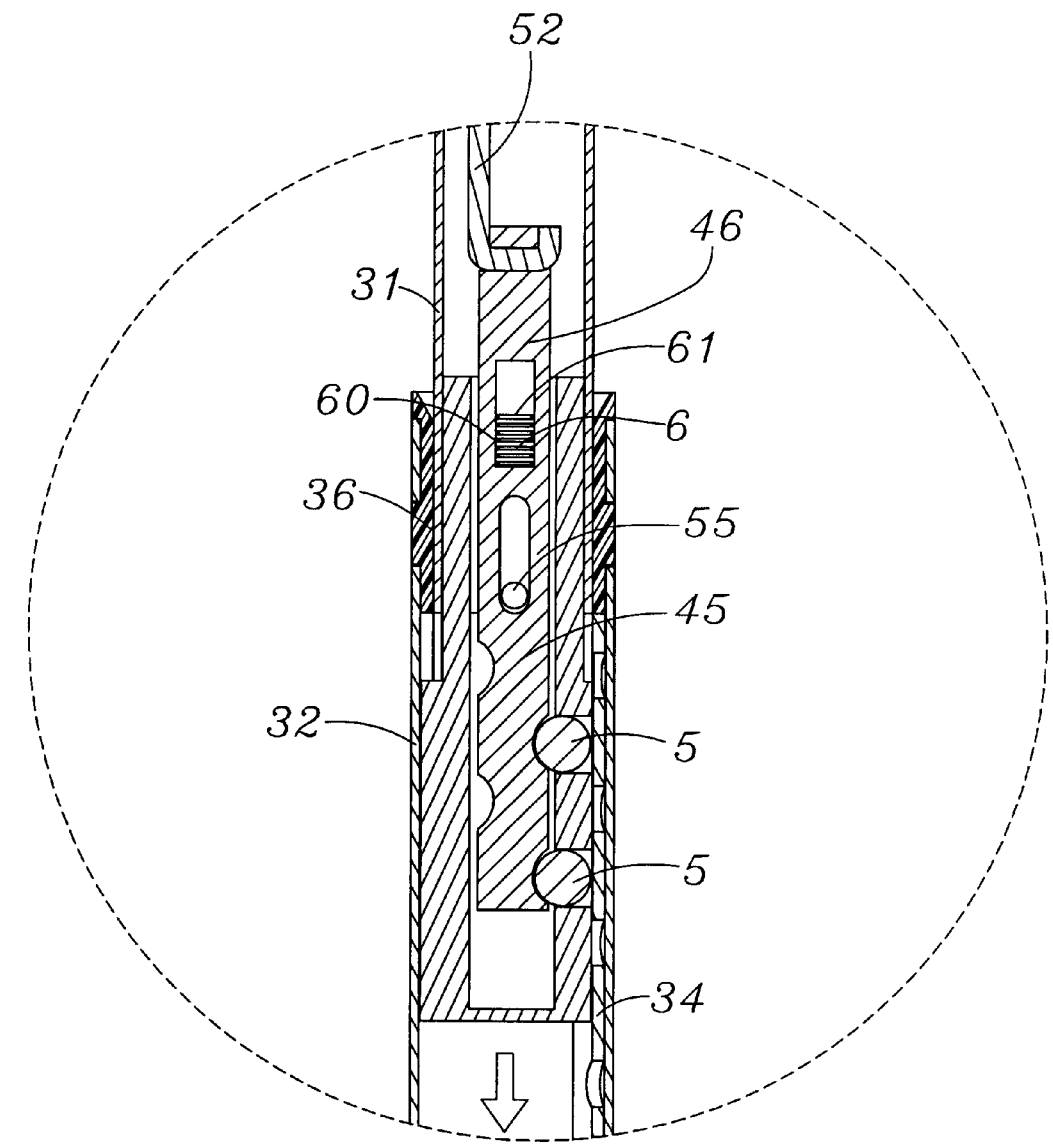
FIG. 9 is a partial cross sectional view showing the pull rod being moved in another embodiment of the present invention.
Figure 10:
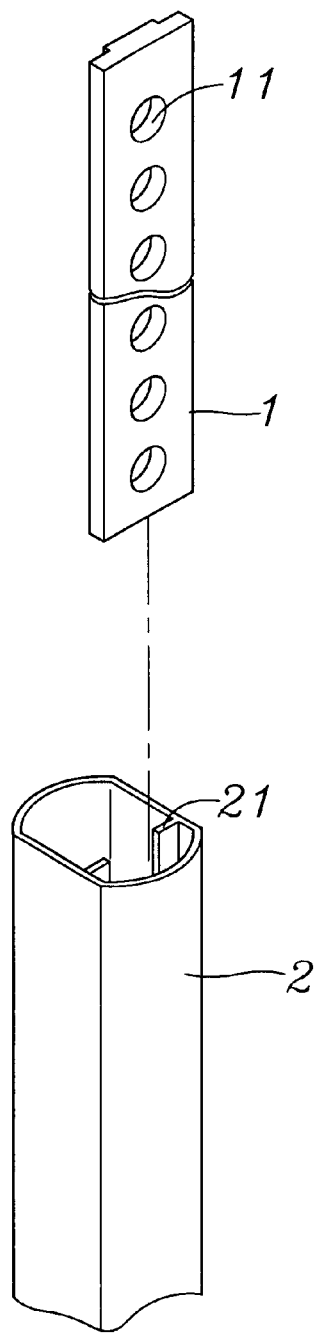
FIG. 10 is a perspective view of a prior art design.

An application of pulling up in the present invention is shown in FIGS. 7 to 9, in the sliding piece 45, another pair of semicircular grooves 38 are turned through 180 degrees for use. Besides, the bottom of the lower rod sleeve 40 is matched with a structure for controlling the third step rod. The related structure has been known in the prior art, thus the details thereof will not be described herein. Therefore, it can achieve an effect of multi-section so that the outlook of the multi-section rod has a flat elliptic shape.

In summary, in the present invention, a porous piece is installed between the elliptic rods to match with the fixing of the lower rod sleeve and the upper rod sleeve. If the porous piece is not very long, it can be combined with the lower rod sleeve. Then, the buckling ball moves in the through hole of the lower rod sleeve. The semicircular grooves of the sliding piece control the moving out or receiving of the buckling ball. The sliding piece is controlled by the control piece of the handle. Since this part has many different structures, the details will not be described further. The sliding piece is installed with a square groove and the square groove is installed with a spring. The width of the spring is larger than that of the square groove and is buckled in a respective confining groove installed on the lower rod sleeve. The spring only moves in the confining groove of the lower rod sleeve. Thus, despite the control piece is pressed to move downwards or pulled to move upwards, it can be used. It is appreciated that the present invention uses a minimum volume and rods to complete the assembly of the present invention. The assembly work is easy and simple. It is suitable in pulling up and pushing down process.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-step positioning device of a trunk pull rod comprising a pair of pull rods spaced one from the other; a handle being connected between the two pull rods; each pull rod including an inner upper rod telescopically disposed in an outer lower rod; said inner upper rod being dimensioned to form a gap between the inner upper rod and the outer lower rod; a porous piece being placed in the gap and fixed in the outer lower rod; an upper end of the outer lower rod being connected to an upper rod sleeve; two opposing sides of the upper rod sleeve each have a protruding buckle for being buckled to a respective buckling hole formed in each of two corresponding opposing sides of the outer lower rod; a lower end of the inner upper rod being connected to a lower rod sleeve; the lower rod sleeve having a slender end passing into the inner upper rod, and an enlarged end portion thereof passing into the outer lower rod; a sliding piece being inserted into an opening formed in a top surface of the lower rod sleeve; the sliding piece having at least one semicircular groove formed therein and having an upper end connected to a driving piece; the driving piece passing through the inner upper rod to be connected to a control piece on the handle; the enlarged end of the lower rod sleeve being formed with at least one through hole facing toward the porous piece, a buckling ball being disposed in the at least one through hole of the lower rod sleeve, the porous piece having a plurality of semicircular grooves formed at places facing toward the through hole of the lower rod sleeve, the porous piece being buckled by the buckling ball being displaced into a respective semicircular groove of the porous piece by an edge of the sliding piece so as to lock together the inner upper rod and the outer lower rod; if the buckling ball slides back through the through hole of the lower rod sleeve into the at least one semicircular groove of the sliding piece responsive to displacement of the sliding piece, then the outer lower rod and inner upper rod will be unlocked and the inner upper rod displaceable relative to the outer lower rod.

2. The multi-step positioning device of a trunk pull rod as claimed in claim 1, wherein a square groove is formed in the sliding piece, and a spring is installed in the square groove, the spring having a width larger than a width of the square groove, and is engaged in a respective confining groove formed in the lower rod sleeve so that the spring only moves in the confining groove of the lower rod sleeve to apply a bias force to the control piece when displaced upwardly or downwardly.

3. The multi-step positioning device of a trunk pull rod as claimed in claim 1, wherein a combining block is disposed at an upper end of the sliding piece, the combining block having two opposing sides formed with a respective straight groove formed therein; the combining block having a fixing hole formed between the straight grooves; the driving piece having a lower end formed in a hook shape with two side portions; after passing through the fixing hole, the two side portions of the lower end of the driving piece are each buckled in a respective straight groove.

4. The multi-step positioning device of a trunk pull rod as claimed in claim 1, wherein a pin hole is installed in the lower rod sleeve, and an elliptic hole is formed on the sliding piece; a pin passes through the pin hole and the elliptic hole.

5. The multi-step positioning device of a trunk pull rod as claimed in claim 1, wherein an upper end of the porous piece resists against a lower end of the upper rod sleeve, while a lower end of the porous piece is formed with a lower inner fixing hole, and a lower outer fixing hole is formed at a respective place at a lower end of the outer lower rod; a short pin in inserted into the lower outer fixing hole and the lower inner fixing hole, and an outer peripheral surface of the porous piece is resisted against by a corresponding outer peripheral surface of the lower rod sleeve.

6. The multi-step positioning device of a trunk pull rod as claimed in claim 5, wherein a plug is inserted in the outer lower rod; a round groove is installed at a lower end of the porous piece near the plug for being inserted by the porous piece, and the short pin is inserted into one transversal hole of the plug.

7. The multi-step positioning device of a trunk pull rod as claimed in claim 1, wherein a cross section of the porous piece has one of a round arc shape, a channel shape, or a contour defined by a round arc body with two parallel sides.

* * * * *